United States Patent Office 3,251,874
Patented May 17, 1966

3,251,874
ISOMERIZATION OF CIS-1,4-CYCLOHEXANEDI-CARBONITRILE TO ITS TRANS ISOMER
Thomas H. Strickland and Charles J. Kibler, Kingsport, Tenn., assignors to Eastman Kodak Company, Rochester, N.Y., a corporation of New Jersey
No Drawing. Filed July 3, 1963, Ser. No. 292,782
6 Claims. (Cl. 260—464)

This invention relates to the conversion of mixtures of cis-1,4-cyclohexanedicarbonitrile and trans-1,4-cyclohexanedicarbonitrile, in which the cis component predominates, into mixtures in which the trans component predominates. More particularly the invention relates to a process in which the cis component is isomerized to the trans component in the presence of a catalyst and in an atmosphere of an agent which serves to preclude decomposition of the components of the cis and trans equilibrium mixture. Still more particularly the invention relates to catalytic equilibration and separation of mixtures of cis and trans isomers of 1,4-cyclohexanedicarbonitrile to produce mixtures containing predominantly the trans isomer and separation therefrom of the substantially pure trans isomer.

The preparation of various nitriles is old and well known in the prior art as illustrated in the disclosure of numerous U.S. patents, examples being Nos. 2,784,212; 2,784,213; 2,770,641; 2,780,637; 2,795,599; and 2,800,-496. It is also known that 1,4-cyclohexanedicarbonitrile exists in two isomeric forms, namely, cis-1,4-cyclohexanedicarbonitrile (melting point 63° C.) and trans 1,4-cyclohexanedicarbonitrile (melting point 141° C.), although, to the best of our knowledge and belief, no reference has been made in the literature to mixtures of such isomers or to conversions thereof whereby a mixture richer in one or the other can be obtained.

In certain industrial processes compounds such as dimethyl 1,4 - cyclohexanedicarboxylate are produced. These compounds can be converted by a catalytic process in the presence of ammonia to an equilibrium mixture of the cis and trans isomers of 1,4-cyclohexanedicarbonitrile containing approximately 42 percent cis-1,4-cyclohexanedicarbonitrile and 58 percent trans-1,4-cyclohexanedicarbonitrile. While this equilibrium mixture may be employed for the production of the corresponding amines by known hydrogenation procedures and the resulting amines may be converted into polymeric amides, it has been found that amides derived from the trans isomer can be more effectively employed in the production of useful polymeric products than can the amides derived from the cis isomer, because of the higher melting and softening points of polymers produced therefrom. The use of such amides, as for example, those derived from 1,4-cyclohexanebis(methylamine), in the production of such polymeric products as fibers, filaments, yarns, sheets, and molded and extruded products is disclosed in the U.S. patent to Bell, Kibler and Smith, No. 3,012,994. It will thus be seen that it would be highly desirable to be able to convert mixtures of the cis and trans isomers of 1,4-cyclohexanedicarbonitrile into mixtures containing as high a proportion as possible of the trans isomer, which isomer could then be employed in the production of the corresponding amines by hydrogenation in the manner above referred to. To provide such a conversion is the principal desideratum of the present invention. So far as we are aware there is no reference anywhere in the technical or patent literature to this particular conversion.

This invention has an object to provide a process for conversion of mixtures of cis and trans isomers of 1,4-cyclohexanedicarbonitrile into mixtures of these isomers containing predominantly the trans isomer.

Another object is to provide a process for equilibration of mixtures of cis and trans isomers containing either more or less of one of these isomers than is present in an equilibrium mixture. The term equilibration as used herein refers to conversion of a mixture of cis and trans isomers, containing either more or less than the amounts of these isomers present in an equilibrium mixture (approximately 42 percent cis isomer and 58 percent trans isomer), to the equilibrium mixture.

Another object is to provide a means of separating the trans isomer from the equilibrium mixture of the cis and trans isomers of 1,4-cyclohexanedicarbonitrile.

A further object is to provide a means of conversion or isomerization of the cis rich mixture or residue remaining after separation of a substantial portion of the trans isomer from a mixture of the cis and trans isomers of 1,4-cyclohexanedicarbonitrile and from which cis rich mixture the trans isomer cannot be conveniently separated, as by fractional crystallization or otherwise, to a mixture of cis and trans isomers which will have the composition of the equilibrium mixture.

A further object is to provide a means of purification of the trans isomer obtained by the separation of this component from a mixture of the cis and trans isomers of 1,4-cyclohexanedicarbonitrile to any degree of purity required by the use to which this component is to be put, even to substantially 100 percent purity.

A still further object of this invention is to provide a process of carrying out the conversion or isomerization of mixtures of the cis and the trans isomers of 1,4-cyclohexanedicarbonitrile wherein decomposition of either the components of the mixture of isomers undergoing isomerization, or the mixture of isomers resulting from the isomerization, is prevented, that is, a process in which the components of such mixture are maintained at all times during conversion or isomerization in the nitrile form.

Other objects will appear hereinafter.

These objects are accomplished by the following invention which, in its broader aspects, comprises passing the vapors of a mixture of the cis and trans isomers of 1,4-cyclohexanedicarbonitrile, together with ammonia, over an alkaline earth metal oxide catalyst or a catalyst such as activated alumina, at a temperature within the range of 325° C. to 500° C. at a contact time of 0.8 second to 5.0 minutes, during which period the composition of the mixture is brought to the composition of the equilibrium mixture, that is, a mixture containing approximately 42 percent cis-1,4-cyclohexanedicarbonitrile and 58 percent trans - 1,4 - cyclohexanedicarbonitrile. The equilibrium mixture is then collected and dissolved in a solvent such as acetic acid or ethanol and the temperature of the resulting solution lowered until the trans isomer crystallizes out. The ammonia effluent is led out of the system for recirculation to the isomerization step or for such other uses as may be desired. The crystalline trans-isomer material is then separated from the solution by filtration or other equivalent means and may be further purified by one or more further crystallizations by redissolving the crystalline material in the solvent and again lowering the temperature until crystallization takes place.

In this manner the trans isomer may be brought to substantially 100 percent purity.

In accordance with the invention the cis rich fraction or residue, which will contain a certain amount of the trans isomer, may then be recycled through the process described above so as to convert the composition of this fraction or residue to the composition of the equilibrium mixture from which the trans isomer may again be recovered by solution and fractional crystallization as previously described.

As indicated above and in accordance with our invention we have found the decomposition by dehydrogenation or decyanolation of either the cis or the trans isomers of 1,4-cyclohexanedicarbonitrile undergoing conversion or isomerization as described above may be suppressed or prevented by having ammonia present in the system during isomerization of the cis component to the trans component. In other words, the presence of the ammonia maintains both isomers, whether they are present in amounts corresponding to the composition of the equilibrium mixture or otherwise, in their original nitrile form. The ammonia may desirably be present in a ratio corresponding to from 0.25 mole of $NH_3$ to as much as 3 moles of $NH_3$ for each mole of the cyclohexanedicarbonitrile material.

Examples of suitable solvents for bringing the trans rich mixture obtained from the conversion or isomerization step into solution for the purification or recrystallization step are acetic, propionic, butyric, isobutyric and other aliphatic acids. Glacial acetic acid has been found to be an especially good solvent for this purpose. Likewise lower aliphatic alcohols such as methyl, ethyl, propyl, isopropyl, butyl, isobutyl and other aliphatic alcohols may be employed for this purpose.

A variety of catalysts may be employed such as the alkaline earth metal oxides or activated aluminum $$(Al_2O_3)$$

which is one of the best. Other suitable oxide catalysts are magnesium oxide (MgO), calcium oxide (CaO) and barium oxide (BaO). The catalyst may also be a combination of alkaline earth metal oxides or a combination of one or more alkaline earth metal oxides with activated alumina in either supported or unsupported form. If a supported catalyst is employed the support should be an inert material such as kieselguhr, diatomaceous earth or similar suitable material well known to those skilled in the art.

In the following examples and description we have set forth several of the preferred embodiments of our invention but they are included merely for purposes of illustration and not as a limitation thereof.

EXAMPLE 1

74 g. of 1,4-cyclohexanedicarbonitrile composed of 12.2 percent of the trans isomer and 87.8 percent of the cis isomer was treated as described below to obtain as nearly as possible the equilibrium mixture. The mixture to be treated, together with ammonia, was introduced into a reactor constructed as follows: The reactor tube constructed of borosilicate glass was 16 inches long and 25 mm. in outside diameter. A borosilicate glass thermowell, 8 mm. in outside diameter, extended the entire length of the reactor tube. The catalyst bed composed of 30 grams of pelleted activated alumina ($Al_2O_3$) was positioned in the central segment of the reactor between top and bottom layers of 3 mm. diameter glass beads.

The reactor and catalyst bed were heated to 480° C. by means of a 750-watt electric furnace, modified with booster elements, where necessary, to maintain a uniform temperature throughout the catalyst bed. A brass sleeve having a ¼-inch wall thickness provided the surface for transfer of heat from the furnace to the reactor. The temperature of the furnace was controlled by a Wheelco Capacitrol with which two thermocouples were used simultaneously. One thermocouple was located in a thermowell in the brass sleeve and the other in the thermowell of the reactor. The temperature in the reactor was recorded by a Leeds and Northrup potentiometer equipped with a probe-type thermocouple located inside the thermowell of the reactor. Such an apparatus is shown and described in Industrial and Engineering Chemistry, vol. 53, page 7, January 1961.

An appropriate receiver for the product evolved from the isomerization reaction was connected to the lower end of the reactor and was provided with a condenser through the central passage of which ammonia and any uncondensed by-product gaseous materials were led from the system.

The mixture of isomers to be treated was passed at the rate of 0.75 mole per hour, concurrently with anhydrous ammonia, introduced at a rate of 1.25 moles per hour, over the heated catalyst. The apparent contact time was 0.9 second and the space velocity was 4,000. The temperature of the receiver was such as to cause the isomerized mixture to condense. Ammonia and any other gaseous by-products passed from the system and the ammonia was separated and recycled to the isomerization step. Proceeding in this manner, 63 g. of an isomeric mixture containing 59.2 percent trans-1,4-cyclohexanedicarbonitrile was collected in the receiver, representing an 85 percent recovery of the original material.

Further runs carried out in the manner described above produced 260 g. of this isomeric mixture containing 59.2 percent of trans-1,4-cyclohexanedicarbonitrile and 40.8 percent of cis-1,4-cyclohexanedicarbonitrile which was then dissolved in 450 cc. of glacial acetic acid at approximately 90 to 110° C. The resulting solution was cooled in accordance with established procedure for recrystallization and the resulting crystalline material collected by filtration. 162 g. of an isomeric mixture of cis and trans-1,4-cyclohexanedicarbonitrile containing 89.6 percent of the trans isomer and 10.4 percent of the cis isomer was thus obtained which contained 95 percent of the trans isomer present in the original 260 g. of the isomeric mixture. By further solution and recrystallization of the trans rich fraction trans-1,4-cyclohexanedicarbontrile may be obtained in substantially 100 percent purity.

Further quantities of trans-1,4-cyclohexanedicarbonitrile were obtained by treating the acetic acid effluent from the fractional crystallization just described in the following manner. The acetic acid was separated from the dissolved 1,4-cyclohexanedicarbonitrile of this effluent by distillation and set aside for future fractional crystallization steps. The distillation residue amounted to 98 g. of 1,4-cyclohexanedicarbonitrile which was composed of 89% cis-1,4-cyclohexanedicarbonitrile and 11% trans-1,4-cyclohexanedicarbonitrile. This recovered isomeric mixture of 1,4-cyclohexanedicarbonitrile was recycled to the isomerization step and treated as described above. 85 g. of 1,4-cyclohexanedicarbonitrile composed of 39.9% cis-1,4-cyclohexanedicarbonitrile and 60.1% trans-1,4-cyclohexanedicarbonitrile was collected in the receiver and represented an 87% recovery of the original 98 g. charge.

EXAMPLE II

Proceeding in accordance with the general procedure of Example I, 10 g. of 1,4-cyclohexanedicarbonitrile (30.1 percent trans isomer; 69.9 percent cis isomer) was passed at a rate of 0.45 mole per hour concurrently with anhydrous ammonia at a rate of 0.25 mole per hour over an activated alumina catalyst which had been previously heated to 450° C. The apparent contact time was 0.8 second. 9.1 g. of 1,4-cyclohexanedicarbonitrile (62 percent trans isomer) was collected in the receiver which represented a 91 percent recovery.

EXAMPLE III

As in Example I, 25 g. of 1,4-cyclohexanedicarbonitrile (30.1 percent trans isomer; 69.9 percent cis isomer) was passed at a rate of 0.45 mole per hour concurrently with anhydrous ammonia at a rate of 0.25 mole per hour over a fused magnesium oxide catalyst which had been previously heated to 450° C. The apparent contact time was 0.8 second. Twenty-two and one-half grams of 1,4-cyclohexanedicarbonitrile (51.2 percent trans isomer) was collected in the receiver which represented a 90 percent recovery.

EXAMPLE IV

As in Example I, thirty-five grams of 1,4-cyclohexanedicarbonitrile (30.1 percent trans isomer; 69.9 percent cis isomer) was passed at a rate of 0.45 mole per hour concurrently with anhydrous ammonia at a rate of 0.25 mole per hour over a calcium oxide catalyst which had been previously heated to 450° C. The apparent contact time was 0.8 second. Twenty-nine and one-half grams of 1,4-cyclohexanedicarbonitrile (52.3 percent trans isomer) was collected in the receiver which represented an 85 percent recovery.

EXAMPLE V

Proceeding in acordance with the general procedure of Example I, twenty grams of 1,4-cyclohexanedicarbonitrile (30.1 percent trans isomer; 69.9 percent cis isomer) was passed at a rate of 0.45 mole per hour concurrently with anhydrous ammonia at a rate of 0.25 mole per hour over a barium oxide catalyst which had been previously heated to 450° C. The apparent contact time was 0.8 second. Seventeen and one-half grams of 1,4-cyclohexanedicarbonitrile (51.8 percent trans isomer) was collected in the receiver which represented an 88 percent recovery.

As indicated in the above descriptive material and in the examples, we have emphasized the desirability of employment of ammonia during isomerization of mixtures of cis-1,4-cyclohexanedicarbonitrile and trans-1,4-cyclohexanedicarbonitrile in accordance with our invention since we have found that this suppresses or eliminates decomposition of either the cis or trans isomer by dehydrogenation or decyanolation. The following two examples in which the simultaneous introduction of ammonia during the conversion or isomerization reaction has been omitted and the use of nitrogen has been substituted illustrate the lower conversions obtained in the absence of ammonia. It will be noted in Example 7 that, even through the catalyst itself has been pretreated with ammonia, the desired equilibrium concentration is not readily obtained.

EXAMPLE VI

Ten grams of 1,4-cyclohexanedicarbonitrile (30.1 percent trans isomer; 69.9 percent cis isomer) was passed at a rate of 0.45 mole per hour concurrently with nitrogen at a rate of 0.25 mole per hour over an activated alumina catalyst which had been previously heated to 450° C. The apparent contact time was 0.8 second. 5.5 grams of 1,4-cyclohexanedicarbonitrile (39 percent trans isomer) was collected which represented a 55 percent recovery. In contrast to Examples I and II, the absence of amonia led to considerable degradation of the 1,4-cyclohexanedicarbonitrile. 0.9 gram of benzonitrile also was collected from this run as a decomposition product.

EXAMPLE VII

An activated alumina catalyst was pretreated by heating at 450° C. in an atmosphere of anhydrous ammonia for one hour. The flow of anhydrous ammonia was then replaced with nitrogen. Ten grams of 1,4-cyclohexanedicarbonitrile (30.1 percent trans-isomer; 69.9 percent cis isomer) was passed at a rate of 0.45 moles per hour concurrently with nitrogen at a rate of 0.25 moles per hour over the pretreated alumina catalyst at 450° C. The apparent contact time was 0.8 second. 7.9 grams of 1,4-cyclohexanedicarbonitrile (42 percent trans isomer) was collected in the receiver which represented a 79 percent recovery.

The results obtained by the practice of our invention will be more graphically illustrated by the following tabulation which refers back to the conditions of the respective examples set out above.

*Isomerization of 1,4-cyclohexanedicarbonitrile*

| Ex. No. | Catalyst | | Mole Ratio—ammonia: 1,4-cyclohexanedicarbonitrile | Trans Isomer, percent | | Recovery, percent |
|---|---|---|---|---|---|---|
| | Composition | Pretreatment | | Starting Mixture | Product | |
| 1 | Al₂O₃ | None | 5:3 | 12.2 | ᵃ ᵉ59.2 | ᶜ85 |
| 2 | Al₂O₃ | None | 0.5:1 | 30.1 | ᵇ62 | 91 |
| 3 | MgO | None | 0.5:1 | 30.1 | ᵇ51.2 | 90 |
| 4 | CaO | None | 0.5:1 | 30.1 | ᵇ52.3 | 85 |
| 5 | BaO | None | 0.5:1 | 30.1 | ᵇ51.8 | 88 |
| 6 | Al₂O₃ | None | 0:1 | 30.1 | ᵇ39 | ᵈ55 |
| 7 | Al₂O₃ | NH₃ᵉ | 0:1 | 30.1 | ᵇ42 | 79 |

ᵃ Reaction temperature 480° C.; Contact time 0.9 second.
ᵇ Reaction temperature 450° C.; Contact time 0.8 second.
ᶜ First cycle only.
ᵈ 0.9 Gram Benzonitrile recovered.
ᵉ One hour at 450° C.

Examples 1 and 2 illustrate the effect of a large excess of ammonia (Example 1) as compared to the lesser concentration of ammonia (Example 2) which may be employed in the practice of our invention. Examples 2 through 5 illustrate the operability of the various alkaline earth metal oxide catalysts under equivalent reaction conditions. Example 6 illustrates the thermal instability of 1,4-cyclohexanedicarbonitrile in the presence of an activated alumina catalyst without ammonia, other conditions being comparable to those of Example 2. The benzonitrile recovered from this run is evidence of both dehydrogenation and decyanolation. Example 7 illustrates that the catalyst is not transferred to a passive or less active state by ammonia (Example 6), but that the ammonia has a direct effect on the thermal stability of 1,4-cyclohexanedicarbonitrile at isomerization temperatures (Example 2).

It will thus be seen that the process of our invention involving the steps of conversion or isomerization and separation provides a means of converting all of the cis component of any given mixture of the cis and trans isomers of 1,4-cyclohexanedicarbonitrile to the more valuable trans form. It will also be seen that by operating in the manner described above and as illustrated by the examples included herein that decomposition of both the cis and trans isomers may be substantially suppressed, and a substantially pure trans isomer fraction obtained.

It will of course be understood from the above description and examples that the cis component of any given mixture of the cis and trans isomers is converted to the trans form by catalytic isomerization whereas the pure trans component is obtained by recrystallization of the trans isomer-rich mixture obtained from the catalytic isomerization step. By the present invention it will be apparent that an efficient means has been provided for producing the trans isomer of 1,4-cyclohexanedicarbonitrile in a form in which it may be readily converted to a valuable high melting, fiber and film-forming amide in accordance with the process of the Bell, Kibler and Smith Patent No. 3,012,994.

Although the invention has been described in considerable detail with particular reference to certain preferred embodiments thereof, variations and modifications can be effected within the spirit and scope of the invention as described hereinabove, and as defined in the appended claims.

We claim:
1. The process of isomerizing a mixture of the cis and trans isomers of 1,4-cyclohexanedicarbonitrile to the equilibrium mixture of said isomers containing approximately 42 percent cis-1,4-cyclohexanedicarbonitrile and

58 percent trans-1,4-cyclohexanedicarbonitrile which comprises contacting the vapors of the cis-1,4-cyclohexanedicarbonitrile and trans-1,4-cyclohexanedicarbonitrile mixture to be treated and wherein the cis and trans isomers of 1,4-cyclohexanedicarbonitrile are present in a ratio differing from their ratio in the equilibrium mixture of said isomers, together with ammonia, with a catalyst selected from the group consisting of an alkaline earth metal oxide and activated alumina at a temperature within the range of the 325° C. to 500° C. and wherein the reaction contact time is 0.8 second to 5.0 minutes.

2. The process of claim 1 wherein the percentage of trans-1,4-cyclohexanedicarbonitrile present in the mixture of cis-1,4-cyclohexanedicarbonitrile and trans-1,4-cyclohexanedicarbonitrile undergoing isomerization is less than 58 percent.

3. The process of claim 1 wherein the catalyst is activated alumina.

4. The process of claim 2 wherein the catalyst is activated alumina.

5. The process of claim 2 wherein the mixture of cis-1,4-cyclohexanedicarbonitrile and trans-1,4-cyclohexanedicarbonitrile obtained in the reaction is dissolved in a solvent selected from the group consisting of an alcohol having the formula XOH, wherein X represents a lower alkyl group, and an acid having the formula YCOOH wherein Y represents a lower alkyl group and the trans-1,4-cyclohexanedicarbonitrile is recovered by fractional crystallization from the resulting solution.

6. The process of claim 4 wherein the mixture of cis-1,4-cyclohexanedicarbonitrile and trans-1,4-cyclohexanedicarbonitrile obtained in the reaction is dissolved in a solvent selected from the group consisting of an alcohol having the formula XOH, wherein X represents a lower alkyl group, and an acid having the formula YCOOH wherein Y represents a lower alkyl group and the trans-1,4-cyclohexanedicarbonitrile is recovered by fractional crystallization from the resulting solution.

References Cited by the Examiner

UNITED STATES PATENTS 3,092,654   6/1963   Schreyer _____ 260—464 X
3,099,680   7/1963   Sennewald et al. ____ 260—464

CHARLES B. PARKER, *Primary Examiner.*

J. P. BRUST, *Assistant Examiner.*